(12) United States Patent
Zanette

(10) Patent No.: US 10,065,551 B1
(45) Date of Patent: Sep. 4, 2018

(54) TRAILER WITH REMOVABLE BOAT COVER

(71) Applicant: Marco A. Zanette, East Haven, CT (US)

(72) Inventor: Marco A. Zanette, East Haven, CT (US)

( * ) Notice: Subject to any disclaimer, the term of this patent is extended or adjusted under 35 U.S.C. 154(b) by 0 days.

(21) Appl. No.: 15/375,931

(22) Filed: Dec. 12, 2016

(51) Int. Cl.
*B60P 3/10* (2006.01)
*B60P 1/43* (2006.01)

(52) U.S. Cl.
CPC .............. *B60P 3/1008* (2013.01); *B60P 1/435* (2013.01); *B60P 3/1075* (2013.01)

(58) Field of Classification Search
CPC ....... B60P 3/1008; B60P 3/1033; B60P 1/435; B60P 3/1075
USPC .......................................................... 296/157
See application file for complete search history.

(56) References Cited

U.S. PATENT DOCUMENTS

| | | | | |
|---|---|---|---|---|
| 1,455,994 A * | 5/1923 | Cowan | ................... | B60P 3/1008 114/343 |
| 2,310,431 A * | 2/1943 | Hart | ........................ | B60P 3/32 114/343 |
| 2,536,189 A * | 1/1951 | Kuns | ........................ | B60P 3/32 212/233 |
| 2,598,458 A * | 5/1952 | Somers | ................. | B60P 3/1025 114/343 |
| 3,009,731 A * | 11/1961 | Fowler | ................. | B60P 3/1041 135/96 |
| 3,348,874 A * | 10/1967 | Gorman | ................. | B60P 3/1041 135/904 |
| 3,604,747 A * | 9/1971 | Gorman | ................. | B60P 3/1041 135/116 |
| 3,718,227 A * | 2/1973 | Swift | ..................... | B60P 3/1033 410/25 |
| 4,261,613 A * | 4/1981 | Alford | ................... | B60P 3/1016 296/156 |
| 4,289,348 A * | 9/1981 | Greene | ..................... | B60P 3/32 114/343 |
| 4,333,191 A * | 6/1982 | Long | ..................... | B60P 3/1041 114/344 |
| 4,420,181 A * | 12/1983 | Hallburg | ............... | B60P 3/1025 296/100.08 |
| 4,923,242 A | 5/1990 | Gentzhorn | | |
| 5,181,760 A | 1/1993 | Muno | | |
| 5,383,702 A * | 1/1995 | Matheson | ............. | B60P 3/1008 114/344 |
| D356,773 S | 3/1995 | Lange | | |

(Continued)

*Primary Examiner* — Kaitlin S Joerger
(74) *Attorney, Agent, or Firm* — DeLio, Peterson & Curcio. LLC.; Thomas E. Ciesco

(57) ABSTRACT

A trailer comprising a frame, wheels rotatably attached to the frame, opposing side panels having a lower edge, opposing first and second vertical edges and a top edge. The trailer includes a front panel having a front panel upper edge, the front panel attached at opposite front panel vertical edges to the first edge of the side panels. The trailer includes a floor disposed on top of the trailer frame and a boat removably attached to the top edge of the opposing side panels. The trailer may include bunkers extending along the trailer length, the bunkers retractable from a position above the trailer floor to a position wherein the bunkers are disposed in or below the trailer floor. The trailer may include an upper frame pivotally attached to the front panel upper edge wherein the boat is removably attached to the upper frame.

19 Claims, 8 Drawing Sheets

(56) References Cited

U.S. PATENT DOCUMENTS

| | | | | |
|---|---|---|---|---|
| 5,505,153 A * | 4/1996 | Veazey | ............... | B60P 3/36 |
| | | | | 114/61.1 |
| 6,293,220 B1 * | 9/2001 | Halsall | ............... | B60P 3/105 |
| | | | | 114/353 |

* cited by examiner

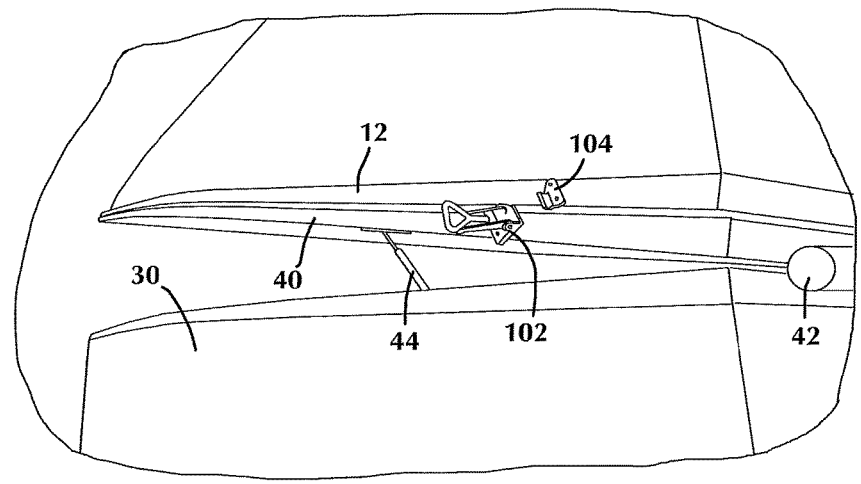
FIG. 13A
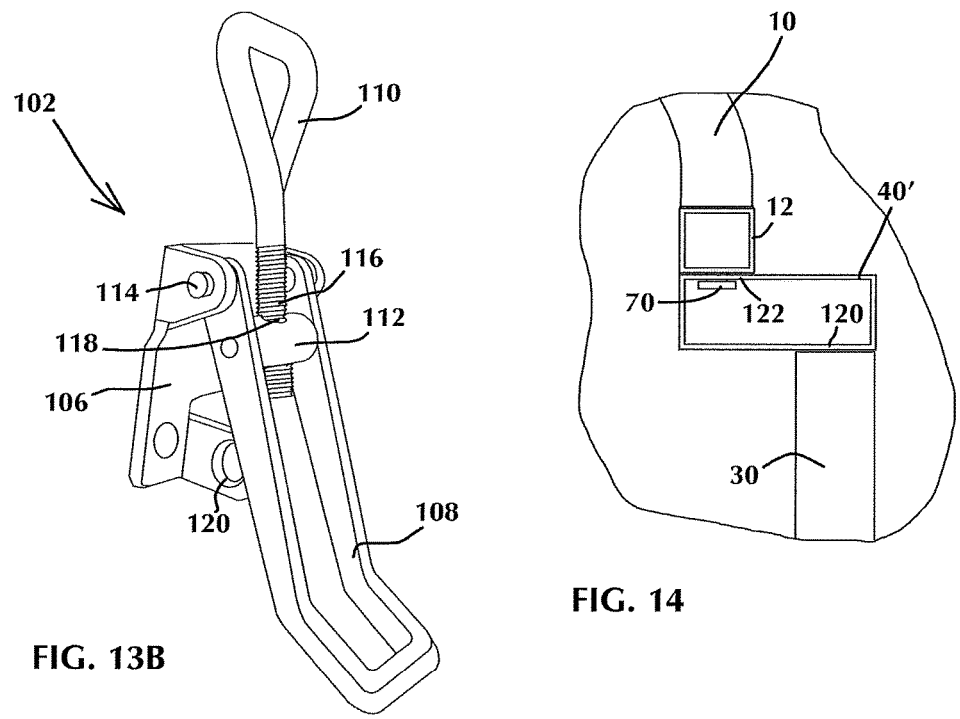
FIG. 13B
FIG. 14

US 10,065,551 B1

TRAILER WITH REMOVABLE BOAT COVER

BACKGROUND OF THE INVENTION

1. Field of the Invention

The present invention relates generally to open trailers and more specifically to trailers having a removable boat cover.

2. Description of Related Art

There are trailers which include a removable boat attached to the roof of a trailer, the boat being secured directly to the roof with fasteners. The boats fit evenly on top of the roof or straddle the roof. The problem is that closed trailers are limiting in the contents which are placed in the trailer and the boat must be placed back on the roof before transporting the boat.

SUMMARY OF THE INVENTION

Bearing in mind the problems and deficiencies of the prior art, it is therefore an object of the present invention to provide a trailer which allows the boat roof to be securely driven into the trailer directly from the water without putting undue stress on the boat hull.

It is another object of the present invention to provide an open trailer having a removable boat roof.

A further object of the invention is to provide a trailer having a secure mounting structure which pivots about the trailer rim.

It is yet another object of the present invention to provide a pivoting mounting structure for a trailer which includes boat mounting fasteners on the mounting structure.

It is still another object of the present invention to provide an open trailer having a retractable bunker which increases storage space on the trailer.

Still other objects and advantages of the invention will in part be obvious and will in part be apparent from the specification.

The above and other objects, which will be apparent to those skilled in the art, are achieved in the present invention which is directed to a trailer comprising a frame and wheels rotatably attached to the frame. The trailer includes opposing side panels having a lower edge, opposing front and rear vertical edges and a top edge. The trailer includes a front panel having a front panel upper edge, the front panel attached at opposite front panel vertical edges to the front edge of the side panels. The trailer includes a floor disposed on top of the trailer frame, the floor extending between the lower edge of the opposing side panels. The trailer has a boat removably attached to the top edge of the opposing side panels.

The trailer may include bunkers extending along the trailer length, the bunkers retractable from a position above the trailer floor to a position wherein the bunkers are disposed in or below the trailer floor. The trailer may include an upper frame pivotally attached to the front panel upper edge, the upper frame corresponding to the upper edges of the side panels and the upper edge of the front panel, wherein the boat is removably attached to the upper frame. The upper frame may be pivotally attached with at least one hinge attached by a first hinge half to the trailer front panel and a second hinge half to the upper frame. The trailer may include at least one hydraulic shock attached at one end to the trailer side panel and at the opposite end to the upper frame, the hydraulic shock urging the upper frame in an upwardly direction. The opposite end of the hydraulic shock may be attached to an adjustable member securably slidable along a portion of the upper frame. The trailer may include a latch system having a hook attached to the boat, a latch base secured to the upper frame, a lever attached to the latch base and a catch pivotally attached to the lever whereby operation of the lever tightens or loosens the boat from the upper frame. The trailer may include a plurality of protrusions on the boat and keyhole openings on the upper frame corresponding to the protrusions on the boat wherein the protrusions are removably engagable with the keyhole openings. The protrusions may include a stem secured to the boat and a circular flange attached to the stem at a distal end of the stem and the keyhole openings include a circular opening having a larger diameter than the protrusion flange and the keyhole opening includes a slot opening extending from the circular opening, the slot opening width smaller than the diameter or the circular flange, whereby the protrusion may be secured within the keyhole opening by inserting the circular flange into the circular opening and sliding the protrusion in the direction of the slot opening. The trailer may include at least one hydraulic shock having a first and second end, the first shock end attached to the trailer side panel and the second shock end attached to the upper frame whereby the hydraulic shock urges the upper frame in an upward direction, reducing the amount of additional force needed to raise the rear portion of the upper frame and supporting the upper frame in a raised position. The upper frame may include a lower surface portion engagable with the side panel upper edge and an upper surface portion engagable with the boat gunwale, the lower surface portion offset from the upper surface portion wherein the boat gunwale is positioned inwardly from the side panel upper edges allowing the boat to be placed inside the trailer in a level upright position.

Another embodiment of the present invention is directed to a trailer comprising a frame, wheels rotatably attached to the frame and opposing side panels having a lower edge, opposing front and rear vertical edges and a top edge. The front panel is attached at opposite front panel vertical edges to the front edge of the side panels. A floor is disposed on top of the trailer frame, the floor extending from the lower edge of opposing side panels. The trailer includes a top frame hingedly attached to an upper portion of the front panel and engagable with upper portions of the side panels and a boat removably attached to the top edge of the opposing side panels, the boat including a gunwale and the trailer includes the boat gunwale attachable to the frame.

The trailer may include at least one hydraulic shock attached at one end to the trailer side panel and at the opposite end to the upper frame, the hydraulic shock urging the upper frame in an upwardly direction. The trailer may include a latch system having a hook attached to the boat, a latch base secured to the upper frame, a lever attached to the latch base and a catch pivotally attached to the lever whereby operation of the lever tightens or loosens the boat from the upper frame. The trailer may include a plurality of protrusions on the boat and keyhole openings on the upper frame corresponding to the protrusions on the boat wherein the protrusions are removably engagable with the keyhole openings. The protrusions may include a stem secured to the boat and a circular flange attached to the stem at a distal end of the stem and the keyhole openings include a circular opening having a larger diameter than the protrusion flange and the keyhole opening includes a slot opening extending from the circular opening, the slot opening width smaller than the diameter or the circular flange, whereby the protrusion may be secured within the keyhole opening by inserting the circular flange into the circular opening and sliding the protrusion in the direction of the slot opening. The upper frame may include a lower surface portion engagable with the side panel upper edge and an upper surface portion engagable with the boat gunwale, the lower surface portion offset from the upper surface portion wherein the boat gunwale is positioned inwardly from the side panel upper edges allowing the boat to be placed inside the trailer in a level upright position.

Another embodiment of the present invention is directed to a method for using a trailer having a boat top. The trailer includes a lower trailer frame, wheels rotatably attached to the frame, opposing side panels each having a lower edge, top edge and a front vertical edge. The trailer includes a front panel attached between the side panel front vertical edges, a floor disposed on top of the trailer frame, the floor extending from side panel lower edges, a top frame hingedly attached to an upper portion of the front panel and engagable with upper portions of the side panels, and a boat removably attached to the top edge of the opposing side panels. The boat includes a gunwale attachable to the frame. The method includes releasing the fasteners securing the top frame to the side panels of the trailer, rotating the top frame about the top frame hinge and supporting the top frame in the rotated position by hydraulic shocks. The method includes lifting the boat from the top frame, rotating the boat so the boat is right-side up and placing the boat in the water. Upon completion of using the boat, the bunkers are positioned above the floor and the trailer is positioned so the trailer rear opening is adjacent the water or in the water and the boat is moved toward and into the trailer so the boat rests on the bunkers.

The boat may include a plurality of gunwale protrusions including a stem secured to the boat and a circular flange attached to the stem at a distal end of the stem. The upper frame may include keyhole openings corresponding to the protrusions on the boat gunwale and the keyhole openings may include a circular opening having a larger diameter than the protrusion flange. The keyhole opening may include a slot opening extending from the circular opening, the slot opening width smaller than the diameter of the circular flange. The protrusions may be removably engagable with the keyhole openings by inserting the circular flange into the circular opening and sliding the protrusion in the direction of the slot opening. The method may include sliding the boat to release the protrusions from the frame keyhole slots before the step of lifting the boat from the top frame. The upper frame may include a lower surface portion engagable with the side panel upper edge and an upper surface portion engagable with the boat gunwale, the lower surface portion offset from the upper surface portion wherein the boat gunwale is positioned inwardly from the side panel upper edges allowing the boat to be placed inside the trailer in a level upright position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 13A is a perspective view of the latch assembly according to the present invention.

FIG. 13B is an enlarged perspective view of the latch shown in FIG. 13A.

FIG. 14 is cross sectional view of one embodiment of the upper frame according to the present invention.

DESCRIPTION OF THE PREFERRED EMBODIMENT(S)

Figure 1:
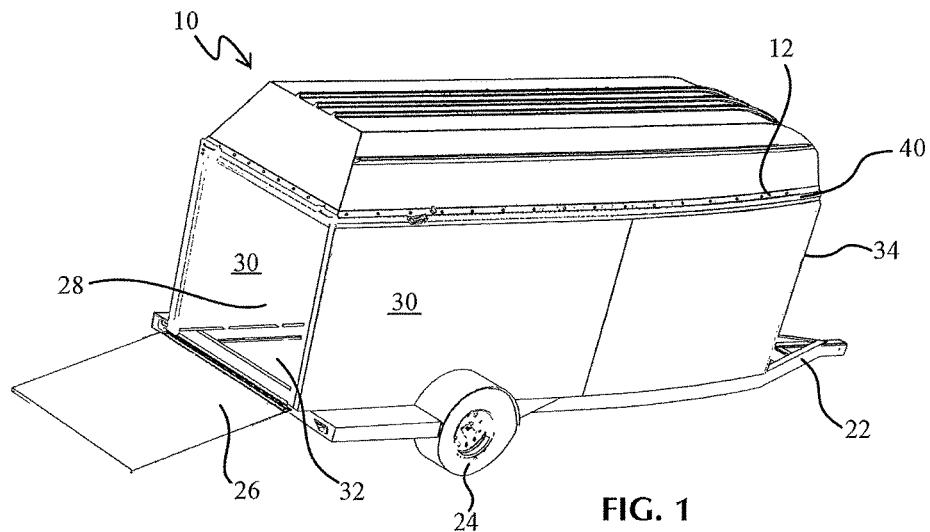
FIG. 1 is a perspective view of the trailer with removable boat cover in a closed position according to the present invention.

In describing the preferred embodiment of the present invention, reference will be made herein to FIGS. 1-16 of the drawings in which like numerals refer to like features of the invention.

The present invention as shown in the attached drawings is directed to a towable trailer which has a roof comprising a boat. The trailer includes vertical side panels, a vertical front panel and a vertical rear panel which may be rotated downward to provide a ramp for loading items into the trailer. A boat is secured upside down to the upper edges of the trailer panels. The boat may be secured to at least one of the panels using clamps or butterfly bolts. A pin/keyhole configuration such as the fasteners on commercial storage racks as seen in retail warehouses may be used. Alternately, the boat may be secured to one of the panels with a removable hinge and may include gas or hydraulic shocks to aid in lifting the boat from the trailer sides as shown in the drawings. The trailer does not include a roof other than the boat, so when the boat is removed there is vertical access to the trailer for putting materials in the trailer such as branches, brush or items which are loaded with a loader bucket. The boat may be used in emergency situations such as flooding or water rescue. The trailer may be part of a multi task emergency response vehicle, the trailer including the removable boat and other emergency items in the trailer such as an ATV, snowmobile, cutting tools and the like.

Figure 2:
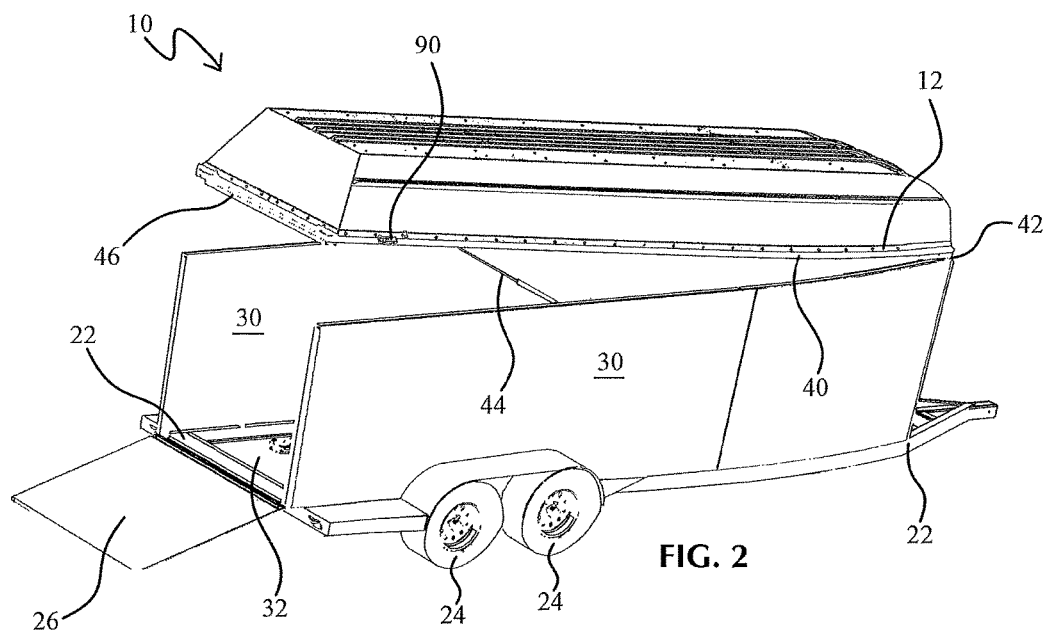
FIG. 2 is a perspective view of the trailer with removable boat cover in an opened position according to the present invention.

The trailer as shown in FIGS. 1 and 2 includes a trailer frame 22 having at least one pair of wheels 24 rotatably attached. The trailer includes opposing trailer sides 30 and a rear opening 28. The rear opening may include a ramp 26 hingedly attached to the trailer frame 22. The ramp 26 may be in an inclined position to make loading of the trailer easier, and may rotate in order to close the rear opening 28 of the trailer. The trailer may include a trailer floor 32 extending along the portion of the frame 22 enclosed by the trailer sides 30, front wall 34 and ramp 26. The trailer may include an upper frame 40 disposed adjacent the upper edge of the trailer sides 30 and upper edge of the trailer front wall 34. The upper frame may be hingedly attached to the upper edge of the front wall 34 so the frame may rotate about the hinge 42. A pair of hydraulic shocks may be mounted on one end to one of the trailer sides 30 and at the opposite end to the upper frame 40 to urge the upper frame rear member 46 in an upward direction. A boat 10 is secured in an upside down direction to the upper frame 40. The boat 10, when secured to the upper frame 40, rotates with the frame 40. The side panels 30, front wall 34 and ramp 26 can be constructed of wood, plastic, fiberglass, composite or any other suitable material and may be single or double walled.

Figure 10A:
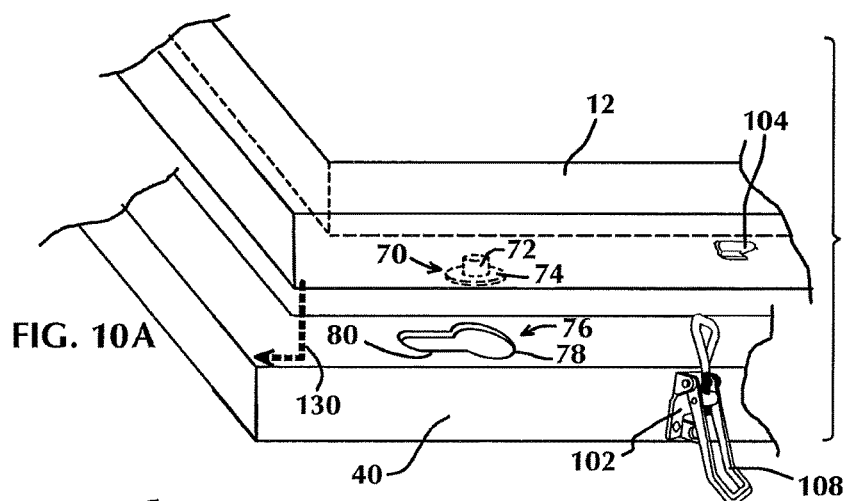
FIG. 10A is an exploded perspective view of a portion of the boat securable to the upper frame according to the present invention.
Figure 10B:
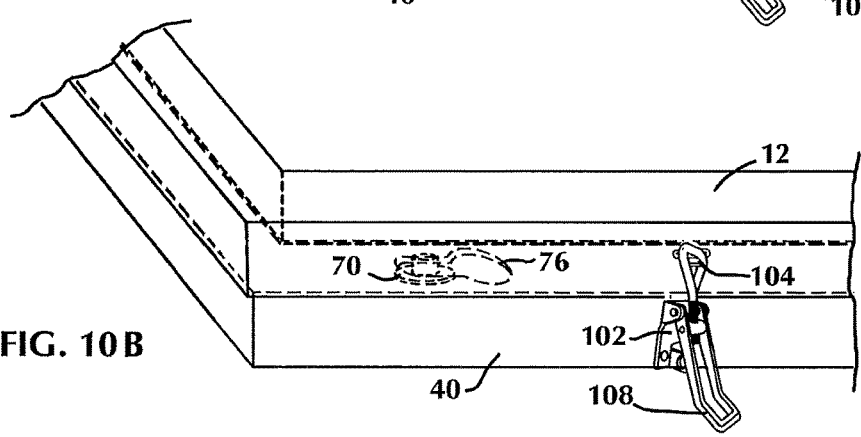
FIG. 10B is an assembled perspective view of a portion of the boat securable to the upper frame shown in FIG. 10A.

The boat 10 may be secured in an upside down direction to the upper frame 49. Additionally, FIGS. 10A and 10B show a close-up of the latch assembly 100 in an exploded view and an assembled secured view, respectively. The top surface of the upper frame 40 may include a plurality of keyhole slot openings 76 having a slotted portion 80 and a larger circular opening 78. The boat gunwale 12 may include a plurality of protrusions 70 having a cylindrical stem 72 and a circular head portion 74 on the distal portion of the stem 72, the head portion 74 having a diameter larger than the stem 72. The protrusions 70 correspond in number and in location to the keyhole slot opening 80. The protrusion head 74 is larger than the width of the keyhole slot opening 80 but smaller than the circular opening 78. In a secured position, the head portion 74 is disposed in the keyhole slotted portion 80. The boat gunwale 12 may be released from the upper frame 40 by releasing latch 102, sliding the protrusions 70 in the direction of the circular opening 78 and lifting the boat 10 from the upper frame 40. In order to re-secure the boat 10 to the upper frame 40, the protrusion head 74 is inserted fully into the circular opening 78, the boat 10 and protrusions 70 are slid in the direction of the keyhole slotted portion 80 as shown by the direction arrow 130 in FIG. 10A, the latch 102 is engaged with the catch 104 and the lever 108 is actuated to secure the gunwale 12 to the upper frame 40.

Figure 3:
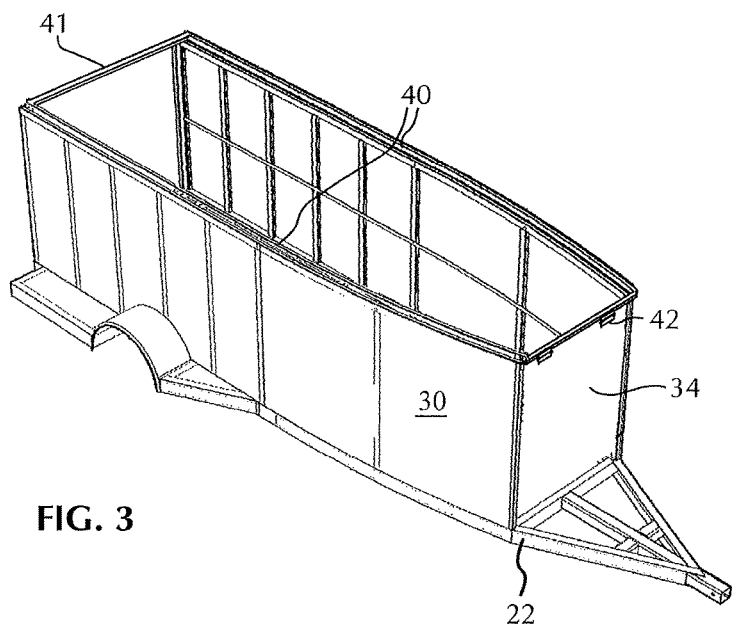
FIG. 3 is a perspective view of the trailer perspective view of the trailer without the removable boat cover according to the present invention.
Figures 4, 5:
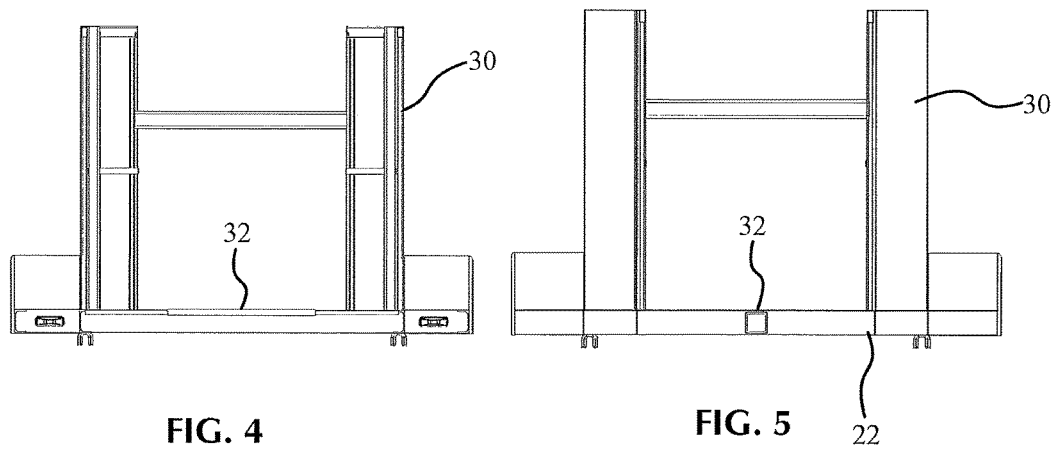
FIG. 4 is a rear elevational view of the trailer shown in FIG. 3.
FIG. 5 is a front elevational view of the trailer shown in FIG. 3.
Figure 6:
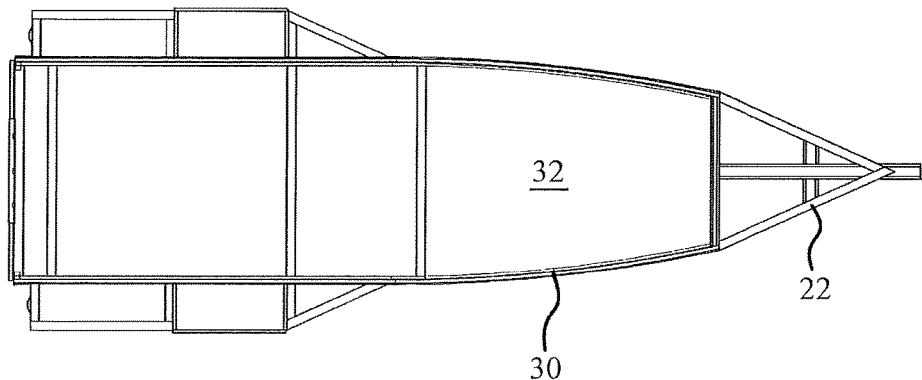
FIG. 6 is a top elevational view of the trailer shown in FIG. 3.
Figure 7:
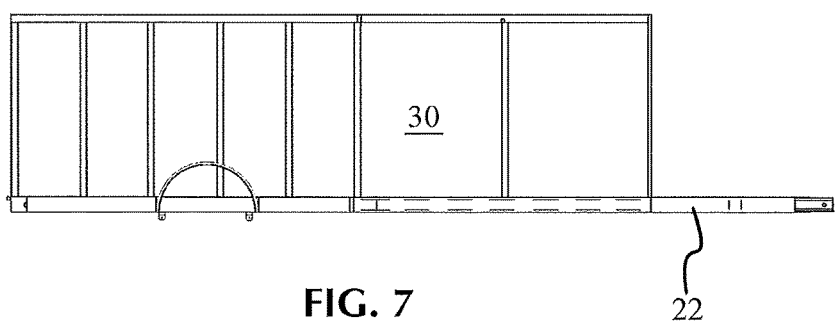
FIG. 7 is a side elevational view of the trailer shown in FIG. 3.

FIGS. 3-7 are elevational views of the trailer with the boat removed. FIG. 3 includes the trailer upper frame 40 in the lowered position while FIGS. 4-7 do not show the upper frame.

The boat 10 and the protrusions 70 may be additionally secured from sliding in the keyhole slot 76 by a plurality of latches 102 fastened to the upper frame 40 and latch hoops 104 fastened to boat 10. In a close-up of the latch assembly shown in FIG. 13, the latch 102 may include a latch handle 96 and a latch hook 94, the latch hook 94 engagable with the latch hoop 104. The latch 102 may include a latch hinge whereby the latch handle may be rotated in order to tighten the upper frame 40 to the latch hook 104, thereby tightening the boat to the upper frame. In another embodiment of a securing fastener, the upper frame 40 may include a threaded bolt and the upper edge of the trailer side may include a female threaded fastener for engaging the threaded bolt. The threaded bolt may be rotated in one direction within the female threaded fastener to tighten the upper frame from the upper edge of the trailer side and in the opposite direction to loosen the upper frame from the upper edge of the trailer side. The rear member 41 of the upper frame 40 may assist in stabilizing the rear portions of the side panels 30 when the upper frame 40 is in the lowered position as shown in FIG. 3. The trailer is generally considered a closed trailer, but when the boat is removed, material may be loaded from above to make loading of material such as landscaping brush easier if being loaded by a backhoe or loader.

Figure 8:
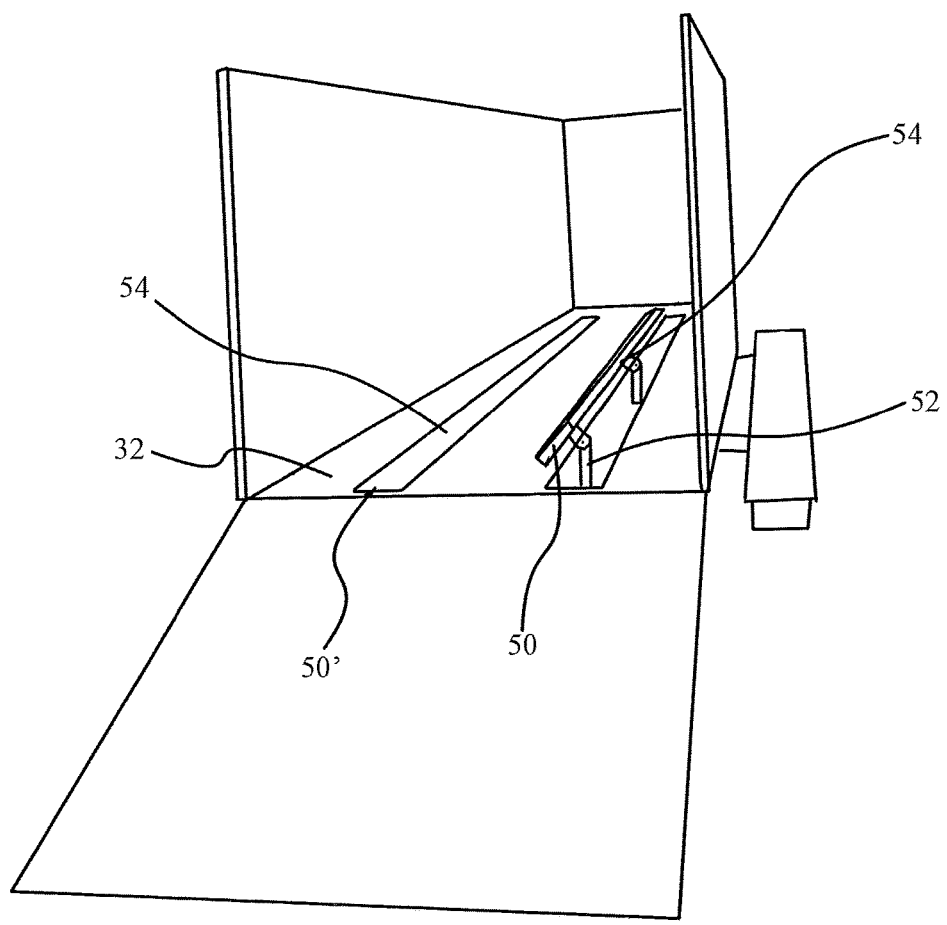
FIG. 8 is a perspective view of the bunkers in a retracted and an extended position according to the present invention.
Figure 9B:
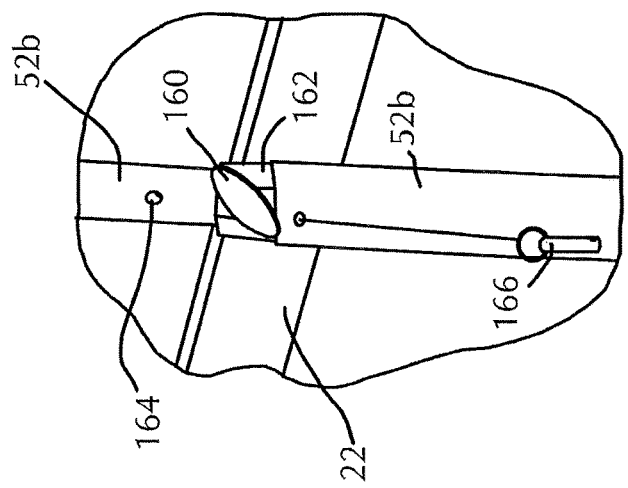
FIG. 9B is a perspective view of the supporting rod according to the present invention.
Figure 9A:
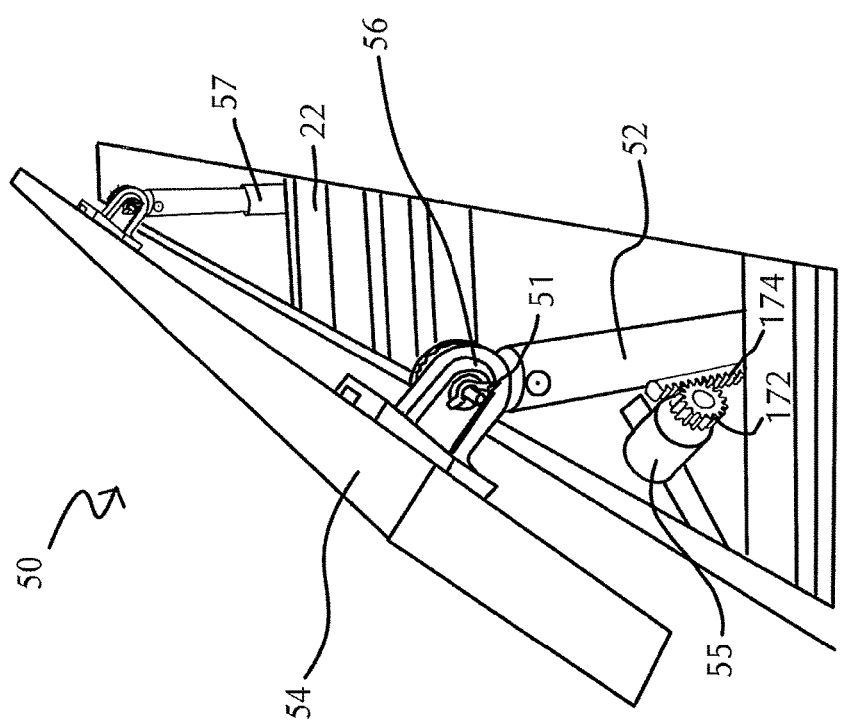
FIG. 9A is a perspective view of the extended bunker and supporting rod according to the present invention.

FIG. 8 shows a retractable support bunker 50 for supporting the boat 10 in an upright position and a bunker 50' in the retracted position. The trailer may include a pair of bunkers 50 for supporting the boat 10. The width w1 of the boat 10 may be less than the inside width w2 of the trailer interior so the boat 10 may be positioned level with the trailer floor 32. The bunker 50 includes a support member 54 parallel with the trailer sides 30 and extending a portion of the trailer length L. A bunker support member 54 is secured to the lower frame 22 or to the trailer floor 32 with a support rod 52, the support rod 52 adjustable in a vertical direction so the bunker support member may be moved from a position level with the trailer floor 32 to a position above the trailer floor 32. FIG. 9A shows a close-up of the bunker in the extended position. Bunkers 50 may be extended or retracted by an electric motor 55 having a rack 174 and pinion 172 or hydraulic shock 57, each shown on one end of the support member 54 in FIG. 9A. The hydraulic shock 57 may constitute the support rod as in FIG. 9A or may be separately attached to support rod 52. As shown in FIG. 9B the support rod 52 may be manually extended or retracted by loosening the support rod handle 190 within the handle collar 162, moving the upper rod section 52b toward or away from lower support rod 52a and tightening the support rod handle 160. Lower support rod 52a may be attached to the frame 22 by welding or other fastening system. Additional securing cotter pin 166 may be inserted into upper rod opening 164 to prevent the upper support rod 52B from collapsing into lower support rod 52a. The angle of the support member 54 is adjustable by loosening wingnut 51 so the teeth on coupling 56 disengage, allowing the coupling 56 to pivot the support member 54 so a hull of any boat may be comfortably supported by the support member and the height of the support member may be adjusted by support rod 52 to allow for various depth hulls.

Figure 11:
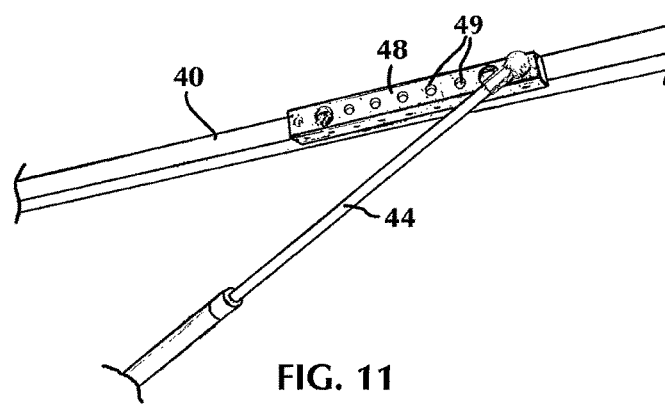
FIG. 11 is a perspective view of the adjustable shock according to the present invention.
Figure 12:
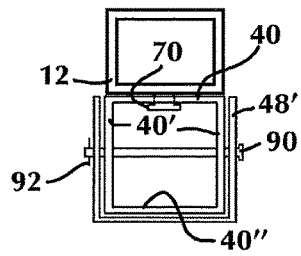
FIG. 12 is a cross sectional view of one embodiment of the shock slidable member attached to the upper frame according to the present invention.

FIG. 11 shows the hydraulic shock 44 for rotating the upper frame about the front hinge 42. The adjustable support shock 44 is fastened at one end to the trailer side 30 and at the opposite end to a shock fastening member 48. The shock fastening member 48 may be an elongated bar disposed adjacent the inner side of the upper frame side member 40 and attached to the upper frame side member 40 with a fastener. As shown in the cross sectional view of FIG. 12, the shock fastening member 48' may alternately be a slidable channel disposed along the lower surface 40" and vertical sides 40' of the upper frame 40 in order to adjust the location of the pressure exerted upwardly on the upper frame 40. As the shock fastening member 48' is slid toward the back of the trailer, the leverage of the shock 44 allows for a heavier boat to be placed on the upper frame 40. In either embodiment, the shock fastening member may be secured to a specific position on the upper frame by inserting a fastener 90 and clevis pin 92 through one of the openings 49 on the shock fastening member 48 and through the opening on the upper frame. Likewise, a plurality of openings may be disposed on the upper frame 40, and a single hole may be disposed on the shock fastening member 48, allowing for a shorter shock fastening member 48.

FIGS. 13A and 13B show one embodiment of the latch assembly 100 for locking the boat 10 to the rotatable upper frame 40 once the protrusion and keyhole slot have been engaged. The latch assembly 100 includes a hook 104 secured to the boat gunwale or side of the boat 10, a latch base 106 secured to the upper frame 40, a lever 108 pivotally attached to the latch base 106, and a catch 102 pivotally attached to the lever 108 at a location between the handle end and the pivot end of the lever 108. The configuration allows the handle to provide leverage for pulling the hook 100 toward the latch base 106. The latch hook 110 includes a threaded portion 116 for engaging a threaded opening 118 in the pivot bolt 112. A tab opening 120 may be attached to the base 106 for insertion of a padlock or other locking device. The latch assembly 100 may be positioned at an angle so that once the hook 110 is engaged with the catch and the lever is rotated to the secured position, the boat 10 is urged toward the front of the trailer, preventing the protrusion from sliding toward the circular opening 78. The latch base 106 may alternately be secured to the trailer side 30 wherein both the upper frame 40 and the boat would be secured in a closed and locked position. In another embodiment, the base may be secured to the boat and the hook may be attached to the upper frame or trailer side. In yet another embodiment, the latch system may be employed for securing the upper frame to the trailer side with a second latch system securing the boat 10 to the upper frame 40. Additionally, the latch assembly may be located on an internal portion of the trailer so that the latch cannot be disengaged when the trailer is locked in the closed position.

As shown in FIG. 14, one embodiment of the upper frame 40' may include a lower surface portion 120 engagable with the upper edge of the side panel 30 and an upper surface portion 122 engagable with the boat gunwale 12. The lower surface portion 120 is vertically offset from the upper surface portion 122. This configuration allows attachment of the boat 10 to the upper frame 40' and the attachment of the side panels 30 to the upper frame 40' with the boat 10 having a smaller outside dimension than the trailer. Since the boat 10 outside dimension is smaller than the trailer interior dimension, the boat may be placed inside the trailer in a level upright position.

The trailer may be used as a storage container since the trailer may be locked and the outer shell can be made waterproof.

In another embodiment of the latch assembly, a butterfly bolt having a larger handle may extend through the trailer, frame and boat. The butterfly bolt may be used to secure the upper frame to the trailer sides, the boat to the upper frame, or both. The larger handle on the butterfly bolt may make the securing process easier.

Guide pins may be used for positioning the boat on the upper portion of the trailer side panels 30 or on the upper frame 40. Guide pins may additionally be used to position and secure the upper frame 40 to the upper portions of the trailer side panels 30.

Figure 15:
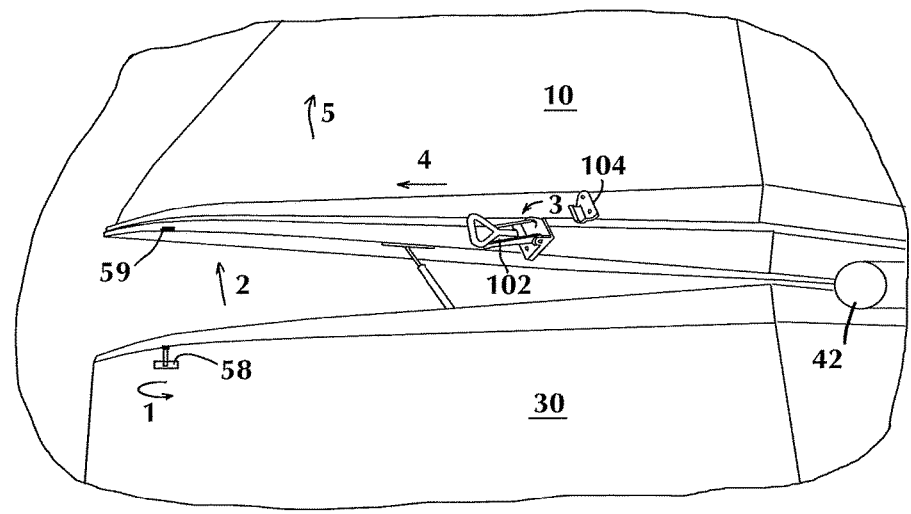
FIGS. 15 and 16 are perspective views of the steps for using the trailer with boat cover according to the present invention.
Figure 16:
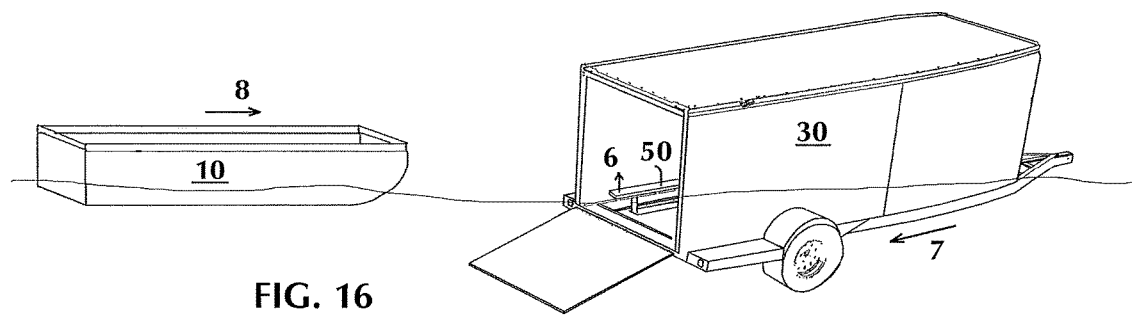

A method of using the trailer with boat top is shown in FIGS. 15 and 16. The user begins by releasing 1 the fasteners 58, 59 securing the upper frame 40 to the side panels 30 of the trailer. The upper frame 40 is rotated, shown in the direction of arrow 2, about the upper frame hinge 42 and hydraulic shocks 44 support the top frame in the rotated position. The boat 10 is then released in the direction of arrow 3 from the upper frame 40 by releasing latch 102, slid in the direction of arrow 4, and lifted in the direction of arrow 5 from the upper frame 40. The boat is then rotated in the direction of arrow 5 to a right-side up position. The boat is then placed in the water. Upon completion of using the boat, the bunkers 50 are positioned in the direction of arrow 6 above the floor and the trailer is positioned in the direction of arrow 7 so the trailer rear opening is adjacent the water or in the water. The boat 10 is then moved in the direction of arrow 8 toward and into the trailer so the boat rests on the bunkers 50.

The method may include the gunwale 12 having a plurality of gunwale protrusions including a stem secured to the boat and a circular flange attached to the stem at a distal end of the stem the upper frame includes keyhole openings corresponding to the protrusions on the boat gunwale. The keyhole openings may include a circular opening having a larger diameter than the protrusion flange and the keyhole opening includes a slot opening extending from the circular opening. The slot opening width is smaller than the diameter of the circular flange. The protrusions are removably engagable with the keyhole openings by inserting the circular flange into the circular opening and sliding the protrusion in the direction of the slot opening. The method therefore includes sliding the boat to release the protrusions from the frame keyhole slots before the step of lifting the boat from the top frame.

The method may include the upper frame having a lower surface portion engagable with the side panel upper edge and an upper surface portion engagable with the boat gunwale. The lower surface portion may be offset from the upper surface portion wherein the boat gunwale is positioned inwardly from the side panel upper edges allowing the boat to be placed inside the trailer in a level upright position.

In the above description it may be shown that the objectives of the invention were met including the objective of providing a trailer which allows the boat roof to be securely driven into the trailer directly from the water without putting undue stress on the boat hull. Additionally, the objectives of providing an open trailer having a removable boat roof and providing a trailer having a secure mounting structure which pivots about the trailer rim have been met. The objectives of providing a pivoting mounting structure for a trailer which includes boat mounting fasteners on the mounting structure and providing an open trailer having a retractable bunker which increases storage space on the trailer have each been met.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
1. A trailer comprising:
a trailer frame;
wheels rotatably attached to the trailer frame;
opposing side panels having a lower edge, opposing front and rear vertical edges and a top edge;

a front panel having a front panel upper edge, the front panel attached at opposite front panel vertical edges to the front edge of the side panels;

a floor disposed on top of the trailer frame, the floor extending between the lower edge of the opposing side panels;

a boat removably attached to the top edge of the opposing side panels; and bunkers extending along the trailer length, the bunkers retractable from a position above the trailer floor to a position wherein the bunkers are disposed in or below the trailer floor.

2. A trailer comprising:

a trailer frame;

wheels rotatably attached to the trailer frame;

opposing side panels having a lower edge, opposing front and rear vertical edges and a top edge;

a front panel having a front panel upper edge, the front panel attached at opposite front panel vertical edges to the front edge of the side panels;

a floor disposed on top of the trailer frame, the floor extending between the lower edge of the opposing side panels;

a boat removably attached to the top edge of the opposing side panels; and an upper frame pivotally attached to the front panel upper edge, the upper frame aligned with the upper edges of the side panels and the upper edge of the front panel, wherein the boat is removably attached to the upper frame.

3. The trailer of claim 2 wherein the upper frame is pivotally attached with at least one hinge is attached by a first hinge half to the trailer front panel and a second hinge half to the upper frame.

4. The trailer of claim 2 including at least one hydraulic shock attached at one end to the trailer side panel and at the opposite end to the upper frame, the hydraulic shock capable of urging the upper frame in an upwardly direction.

5. The trailer of claim 4 wherein the opposite end of the hydraulic shock is attached to an adjustable member securably slidable along a portion of the upper frame.

6. The trailer of claim 2 including a latch system having a hook attached to the boat, a latch base secured to the upper frame, a lever attached to the latch base and a catch pivotally attached to the lever whereby operation of the lever tightens or loosens the boat from the upper frame.

7. The trailer of claim 6 including a plurality of protrusions on the boat and keyhole openings on the upper frame corresponding to the protrusions on the boat wherein the protrusions are removably engagable with the keyhole openings.

8. The trailer of claim 7 wherein the protrusions include a stem secured to the boat and a circular flange attached to the stem at a distal end of the stem and the keyhole openings include a circular opening having a larger diameter than the protrusion flange and the keyhole opening includes a slot opening extending from the circular opening, the slot opening width smaller than the diameter or the circular flange, whereby the protrusion may be secured within the keyhole opening by inserting the circular flange into the circular opening and sliding the protrusion in the direction of the slot opening.

9. The trailer of claim 2 including at least one hydraulic shock having a first and second end, the first shock end attached to the trailer side panel and the second shock end attached to the upper frame whereby the hydraulic shock urges the upper frame in an upward direction, reducing the amount of additional force needed to raise the rear portion of the upper frame and supporting the upper frame in a raised position.

10. The trailer of claim 2 wherein the upper frame includes a lower surface portion engagable with the side panel upper edge and an upper surface portion engagable with the boat gunwale, the lower surface portion offset from the upper surface portion wherein the boat gunwale is positioned inwardly from the side panel upper edges allowing the boat to be placed inside the trailer in a level upright position.

11. The trailer of claim 3 wherein the boat includes a gunwale and the trailer includes the boat gunwale attachable to the frame.

12. The trailer of claim 11 including at least one hydraulic shock attached at one end to the trailer side panel and at the opposite end to the upper frame, the hydraulic shock urging the upper frame in an upwardly direction.

13. The trailer of claim 11 including a latch system having a hook attached to the boat, a latch base secured to the upper frame, a lever attached to the latch base and a catch pivotally attached to the lever whereby operation of the lever tightens or loosens the boat from the upper frame.

14. The trailer of claim 11 including a plurality of protrusions on the boat and keyhole openings on the upper frame corresponding to the protrusions on the boat wherein the protrusions are removably engagable with the keyhole openings.

15. The trailer of claim 14 wherein the protrusions include a stem secured to the boat and a circular flange attached to the stem at a distal end of the stem and the keyhole openings include a circular opening having a larger diameter than the protrusion flange and the keyhole opening includes a slot opening extending from the circular opening, the slot opening width smaller than the diameter or the circular flange, whereby the protrusion may be secured within the keyhole opening by inserting the circular flange into the circular opening and sliding the protrusion in the direction of the slot opening.

16. The trailer of claim 11 wherein the upper frame includes a lower surface portion engagable with the side panel upper edge and an upper surface portion engagable with the boat gunwale, the lower surface portion offset from the upper surface portion wherein the boat gunwale is positioned inwardly from the side panel upper edges allowing the boat to be placed inside the trailer in a level upright position.

17. A method for using a trailer having a boat top comprising:

providing a trailer having a lower trailer frame, wheels rotatably attached to the frame, opposing side panels each having a lower edge, top edge and a front vertical edge, a front panel attached between the side panel front vertical edges, a floor disposed on top of the trailer frame, the floor extending from side panel lower edges, a top frame hingedly attached to an upper portion of the front panel and engagable with upper portions of the side panels, and a boat removably attached to the top edge of the opposing side panels, the boat including a gunwale and the trailer includes the boat gunwale attachable to the frame;

releasing the fasteners securing the top frame to the side panels of the trailer;

rotating the top frame about the top frame hinge;

supporting the top frame in the rotated position by hydraulic shocks;

lifting the boat from the top frame;

rotating the boat so the boat is right-side up;
lowering the boat in the water;
positioning the bunkers above the floor upon completion of using the boat;
positioning the trailer so the trailer rear opening is adjacent the water or in the water; and
moving the boat toward and into the trailer so the boat rests on the bunkers.

18. The method according to claim 17 wherein the boat includes a plurality of gunwale protrusions including a stem secured to the boat and a circular flange attached to the stem at a distal end of the stem, the upper frame including keyhole openings corresponding to the protrusions on the boat gunwale, the keyhole openings including a circular opening having a larger diameter than the protrusion flange and the keyhole opening includes a slot opening extending from the circular opening, the slot opening width smaller than the diameter of the circular flange, the protrusions removably engagable with the keyhole openings by inserting the circular flange into the circular opening and sliding the protrusion in the direction of the slot opening and wherein the method includes sliding the boat to release the protrusions from the frame keyhole slots before the step of lifting the boat from the top frame.

19. The method according to claim 17 wherein the upper frame includes a lower surface portion engagable with the side panel upper edge and an upper surface portion engagable with the boat gunwale, the lower surface portion offset from the upper surface portion wherein the boat gunwale is positioned inwardly from the side panel upper edges allowing the boat to be placed inside the trailer in a level upright position.

* * * * *